(12) United States Patent
Madhavan et al.

(10) Patent No.: US 9,200,902 B2
(45) Date of Patent: Dec. 1, 2015

(54) METHOD OF PROCESSING GLOBAL NAVIGATION SATELLITE SYSTEM DATA

(75) Inventors: Sethu K. Madhavan, Canton, MI (US); Chaminda Basnayake, Windsor (CA); Chester A. Huber, Grosse Pointe Farms, MI (US); Eray Yasan, Canton, MI (US)

(73) Assignee: General Motors LLC, Detroit, MI (US)

( * ) Notice: Subject to any disclaimer, the term of this patent is extended or adjusted under 35 U.S.C. 154(b) by 1497 days.

(21) Appl. No.: 12/636,248

(22) Filed: Dec. 11, 2009

(65) Prior Publication Data

US 2011/0144911 A1 Jun. 16, 2011

(51) Int. Cl.
| G01C 21/00 | (2006.01) |
| G01C 21/32 | (2006.01) |
| G01S 19/20 | (2010.01) |
| G01S 19/08 | (2010.01) |
| G01S 19/42 | (2010.01) |

(52) U.S. Cl.
CPC .............. *G01C 21/00* (2013.01); *G01S 19/08* (2013.01); *G01S 19/42* (2013.01); *G01S 19/20* (2013.01)

(58) Field of Classification Search
CPC ......... G01C 21/00; G01S 19/08; G01S 19/42; G01S 19/20
USPC .............. 701/208, 214; 342/357.13, 357.58
See application file for complete search history.

(56) References Cited

U.S. PATENT DOCUMENTS

| 6,240,368 | B1 | 5/2001 | Kreft |
| 6,266,007 | B1 | 7/2001 | Lennen |
| 6,704,564 | B1 | 3/2004 | Lange |
| 2004/0142659 | A1 | 7/2004 | Oesterling |
| 2005/0027449 | A1 | 2/2005 | Marsh |
| 2007/0005244 | A1* | 1/2007 | Nadkarni ....................... 701/213 |
| 2008/0117102 | A1* | 5/2008 | Syrjarinne et al. ........ 342/357.12 |
| 2009/0066576 | A1* | 3/2009 | van Diggelen ........... 342/357.13 |
| 2010/0220004 | A1* | 9/2010 | Malkos et al. ............ 342/357.12 |

OTHER PUBLICATIONS

Mark A. Sturza, Litton Aero Products, Received Mar. 1983, "GPS Navigation Using Three Satellites and a Precise Clock", 11 pages.

* cited by examiner

*Primary Examiner* — Redhwan k Mawari
*Assistant Examiner* — Rodney P. King
(74) *Attorney, Agent, or Firm* — Anthony Luke Simon; Reising Ethington P.C.

(57) ABSTRACT

A method of processing global navigation satellite system (GNSS) data includes identifying one or more GNSS satellites servicing a predefined area, receiving at least one of GNSS almanac data or space-based augmentation system (SBAS) data for the satellites servicing the predefined area, determining the performance of the GNSS satellites servicing the predefined area using the almanac data or SBAS data, and applying a performance rating to the predefined area based on the performance of the GNSS satellites.

20 Claims, 3 Drawing Sheets

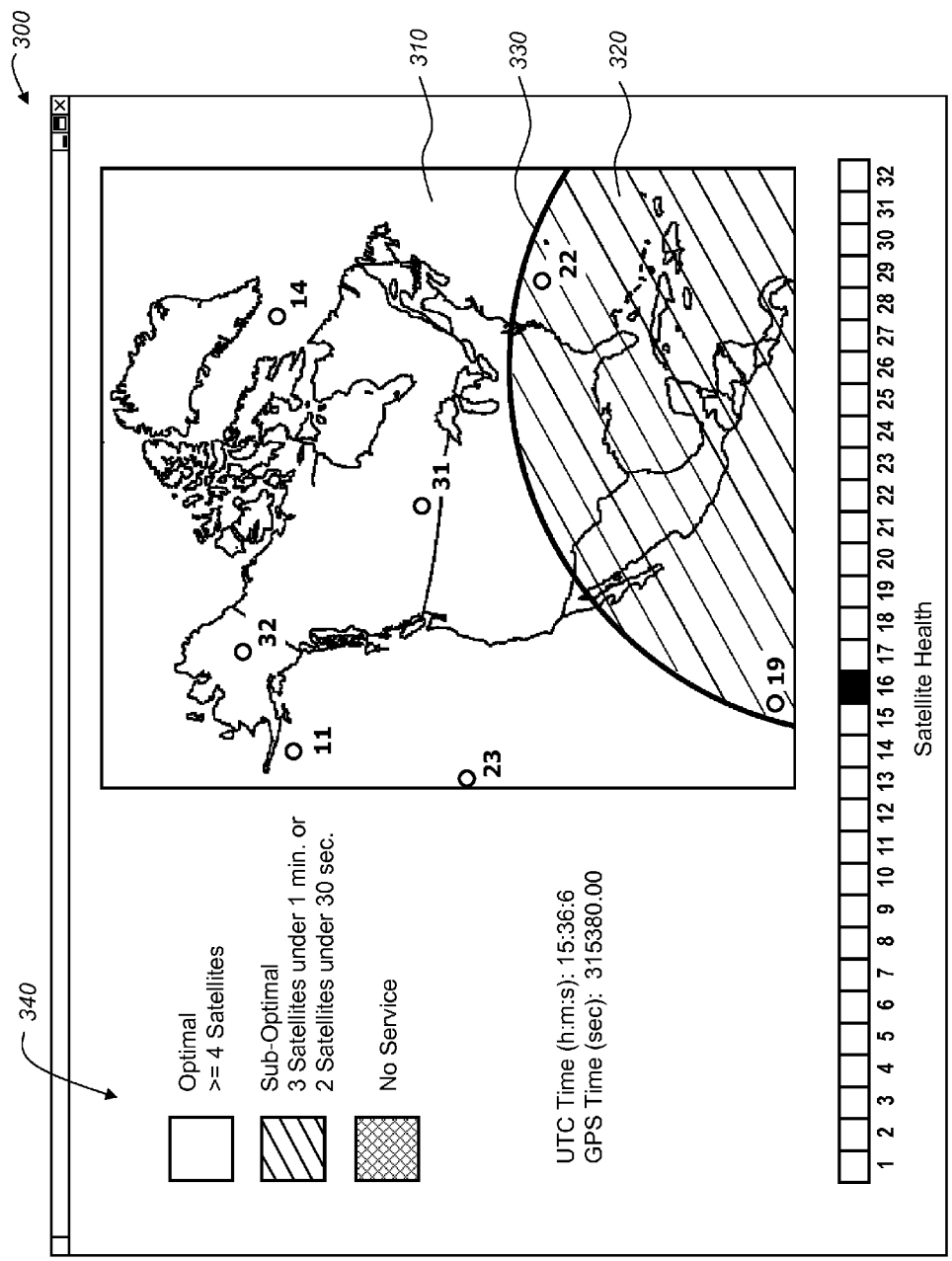

METHOD OF PROCESSING GLOBAL NAVIGATION SATELLITE SYSTEM DATA

TECHNICAL FIELD

The present invention relates generally to global navigation satellite system (GNSS) data, and more particularly to a method of processing GNSS data.

BACKGROUND OF THE INVENTION

Vehicles and wireless devices include an increasing variety and amount of communication capabilities and available services. These capabilities and services include global positioning system (GPS) receivers for determining a vehicle or wireless device position. GPS is one example of a global navigation satellite system (GNSS) system. A GNSS system includes a network of satellites that orbits the earth and provides location services to individuals and devices using receivers capable of receiving data provided by the satellites. GPS uses a constellation of between 24 and 32 satellites transmitting precise radio wave signals that allow a GPS receiver to determine a current location, a precise time, and a velocity. Presently, a large number of vehicles and wireless devices leave a factory with equipment—such as a GPS receiver—capable of receiving the precise radio wave signals and determining location. Among other capabilities, these vehicles and/or wireless devices are able to transmit location information to a call center or other central facility and communicate with the call center. As a result, someone using the vehicle or wireless device equipped to receive the precise radio wave signals sends data from the vehicle or wireless device that can facilitate a service provided by the call center.

However, the performance of any one of the satellites in the constellation can vary. For instance, GPS is designed to provide at least six satellites in view from any point on the earth's surface. Sometimes, even though six or more satellites are within a line of sight, the performance of one or more of these satellites degrades to the point that the satellite(s) cannot provide positional information. As a result, the location calculated by the GPS receiver or other equipment capable of receiving the precise radio wave signals suffers from error or may not be as accurate as desired.

Attempts have been made to reduce the magnitude and frequency of GPS errors using satellite based augmentation systems (SBAS). One example of an SBAS is the Wide Area Augmentation System (WAAS). The WAAS is an aircraft navigation aid that uses a network of ground-based reference stations to measure small variations in the satellite signals of GPS satellites. These measurements are then sent to master stations that generate corrections. The corrections are transmitted to a space-based segment of WAAS comprising WAAS satellites that communicate the corrections to WAAS-equipped GPS receivers. While WAAS helps reduce GPS error, several limitations exist. For instance, WAAS error correction is generally used by WAAS-equipped receivers that are more expensive than GPS receivers that are unable to use WAAS. In addition, non-SBAS-equipped GPS receivers can provide inaccurate data to the call center reducing the value of call center services.

SUMMARY OF THE INVENTION

According to an aspect of the invention, there is provided a method of processing global navigation satellite system (GNSS) data. The method includes identifying one or more GNSS satellites servicing a predefined area, receiving at least one of GNSS almanac data or space-based augmentation system (SBAS) data for the satellites servicing the predefined area, determining the performance of the GNSS satellites servicing the predefined area using the almanac data or SBAS data, and applying a performance rating to the predefined area based on the performance of the GNSS satellites.

According to another aspect of the invention, there is provided a method of processing GNSS data. The method includes identifying one or more GNSS satellites servicing a predefined area, receiving space-based augmentation system (SBAS) data that indicates the health of the servicing GNSS satellites, segmenting the predefined area into two or more sections, classifying each section using a performance rating based on the SBAS data, and displaying a map that depicts the sections and the predefined area.

According to yet another aspect of the invention, there is provided a method of processing GNSS data. The method includes detecting one or more GNSS satellites available a particular location, receiving space-based augmentation system (SBAS) data for the available GNSS satellites, determining the service quality of the available GNSS satellites using error data for the GNSS satellites included in the received SBAS data, classifying the location with a performance rating based on the determined service quality, and identifying the particular location on a map display using the performance rating.

BRIEF DESCRIPTION OF THE DRAWINGS

One or more preferred exemplary embodiments of the invention will hereinafter be described in conjunction with the appended drawings, wherein like designations denote like elements, and wherein:

FIG. 3 is a screen shot of an exemplary map display used with a method of processing global navigation satellite system data.

DETAILED DESCRIPTION OF THE PREFERRED EMBODIMENT(S)

The method described below involves using global navigation satellite system (GNSS) data and/or space-based augmentation system (SBAS) data to determine the health of a constellation or constellation subset of GNSS satellites. Both the GNSS satellites and the SBAS satellites broadcast information that indicates the health of the GNSS satellites. This information can be used to identify the identity and location of GNSS satellites that are not performing optimally. Using the identity and location of these satellites, a facility, such as a call center, can determine areas or locations where GNSS satellite service is degraded or unavailable. The locations or areas can then be indicated using a map display.

Figure 1:
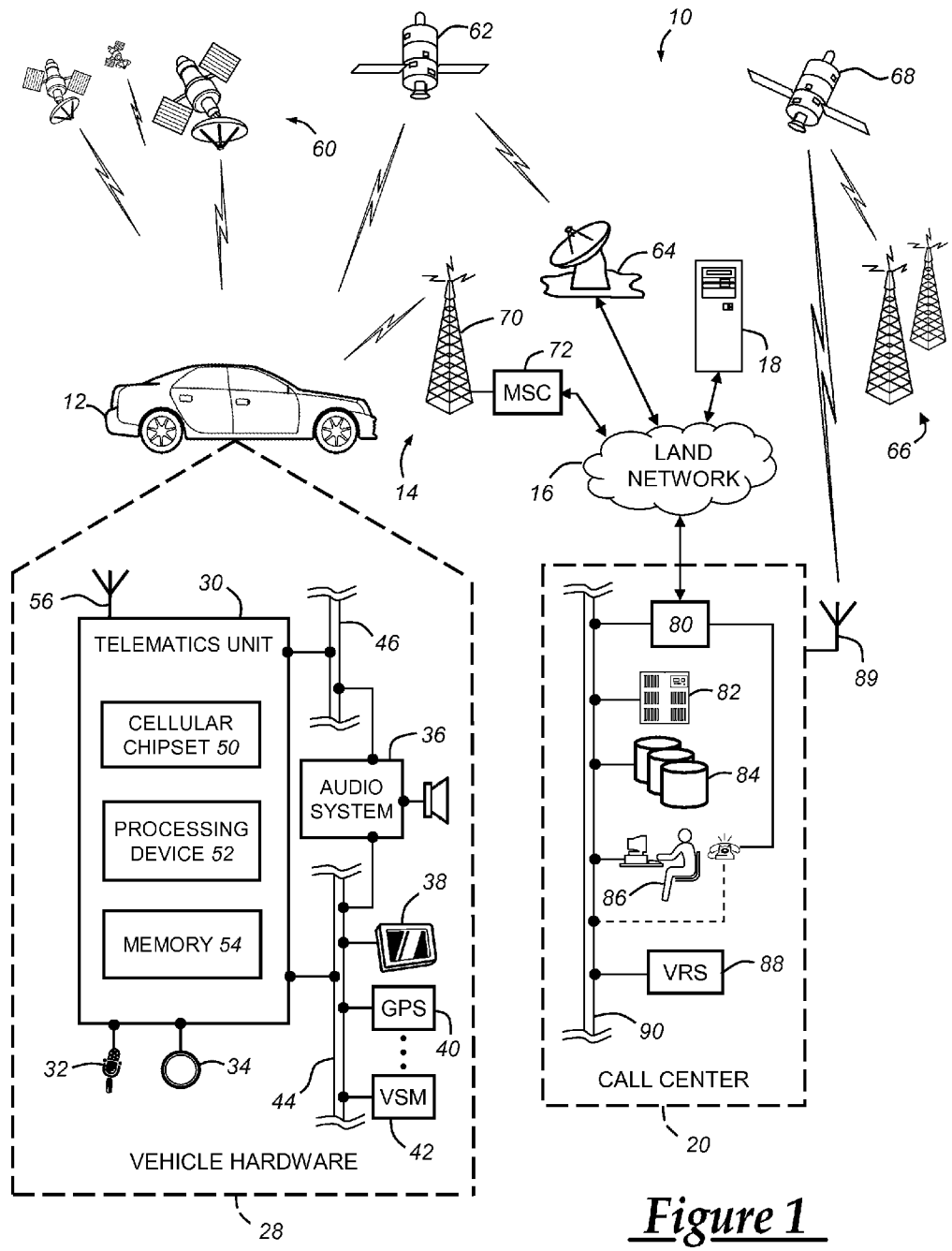
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module (GPS module) 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. GPS signals can include ephemeris and almanac data from a particular GPS satellite. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30. It should be appreciated that while the GNSS system is described using GPS conventions, the method described herein is capable of use with other GNSS systems, such as GLONASS and Galileo.

An SBAS system supports GNSS augmentation with additional satellite-broadcast messages. While the SBAS system below is described with respect to the Wide Area Augmentation System (WAAS), other examples of SBAS systems include the European Geostationary Navigation Overlay Service (EGNOS) and the Multifunctional Satellite Augmentation System (MSAS). More specifically, SBAS systems, such as WAAS, include a ground segment 66 and space segment 68. The ground segment 66 includes a plurality of ground stations located at precisely surveyed positions that take measurements of one or more GPS satellites in the constellation 60. There are three types of ground stations: wide area reference stations, wide area master stations, and ground uplink stations. The wide area reference stations monitor and collect data from the satellite constellation 60 and other sources and send the data to wide area master stations using the land network 16 or computer 18. The sent data is based on factors such as ephemeris data included with GPS satellite transmissions or environmental factors that can affect the signal transmitted from GPS satellites. Using the data, the wide area master stations can detect and/or calculate errors present in the transmission from GPS satellites. The wide area master stations can calculate two types of errors; fast errors and slow errors. For instance, fast errors involve rapidly changing errors, such as clock errors and satellite ephemeris data. Slow errors, on the other hand, involve long term errors, such as ionospheric delay corrections. Both fast and slow errors can then be sent to the ground uplink stations for communication to the space segment 68. The space segment 68 includes geosynchronous communications satellites that receive the errors from the ground uplink stations and broadcast the errors to GPS receivers capable of using WAAS correction data. The satellites of the space segment 68 also can perform similar functions as those performed by satellites in constellation 60 and function in the same manner as satellites in constellation 60.

Apart from the audio system 36 and GPS module 40, the vehicle 12 can include other vehicle system modules (VSMs) 42 in the form of electronic hardware components located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, and antenna 89 all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used. Using the antenna 89, the call center 20 can receive the aforementioned GPS error data broadcast by the space segment 68. In one example, the call center 20 includes the capabilities, such as through antenna 89, to receive the broadcast of the space segment 68 much like a WAAS-equipped receiver would. In another example, the call center 20 can receive the GPS error data broadcast from the space segment 68 through a remote receiver or sensor (not shown) that can communicate with the call center 20 through the wireless carrier system 14, land network 16, or computer 18.

Figure 2:
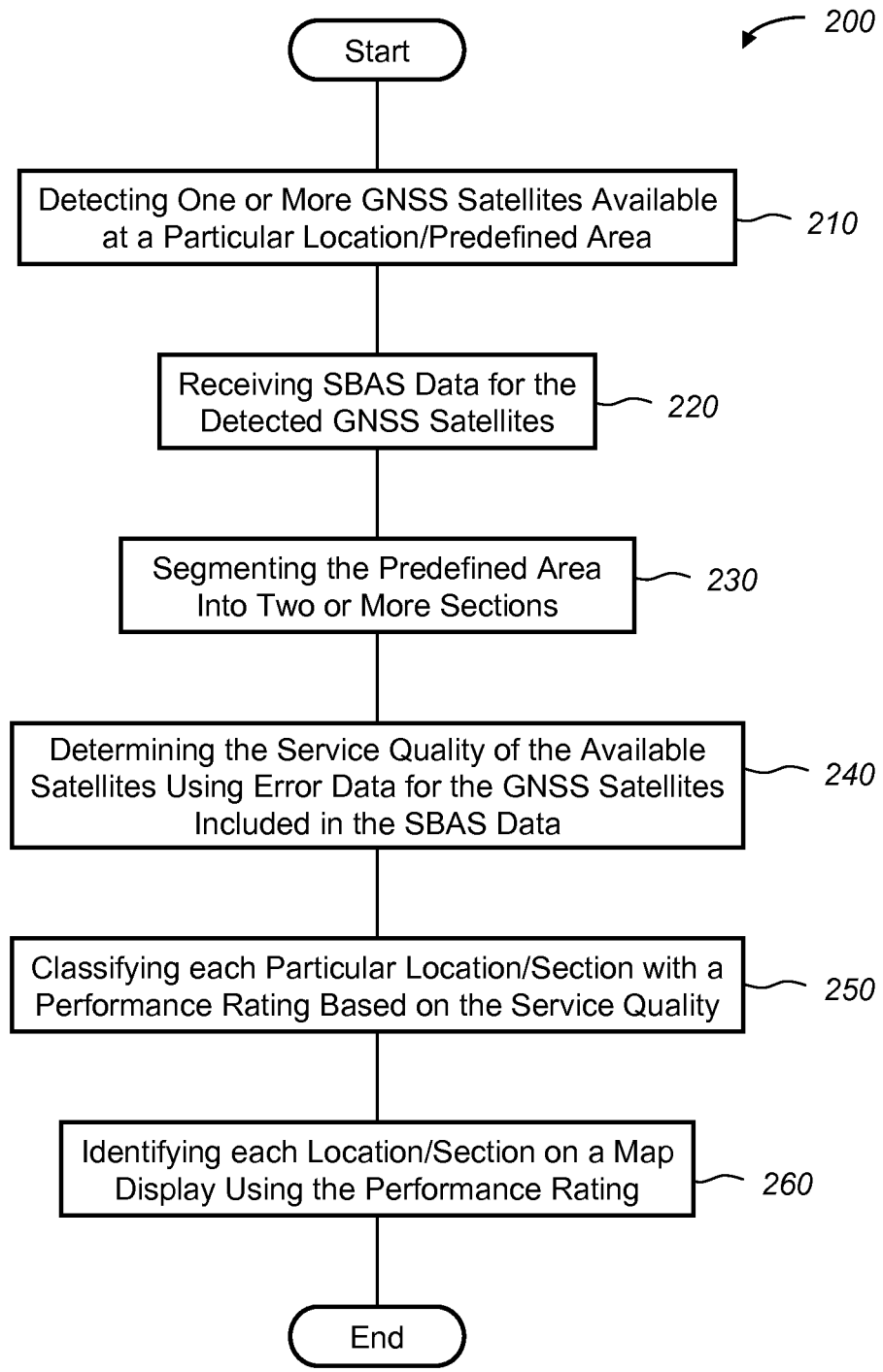
FIG. 2 is a flow chart depicting an exemplary embodiment of a method of processing global navigation satellite system data.

Turning now to FIG. 2, there is a method of processing global navigation satellite system (GNSS) data. The method 200 begins at step 210 with detecting one or more GNSS satellites available at a particular location and/or available in a predefined area. A particular location can be a geographical point at which a user can calculate a position based on received GNSS satellite data. This particular location can be predetermined and fixed at the call center 20 or could be determined in real time based on the location determined by the vehicle 12 using the GPS module 40. At this location, the call center 20 can determine the both the quantity and identity of GPS satellites available to the GPS module 40 at any particular time. Similarly, a predefined area can be an area predetermined or established in real time at the call center 20 or based on vehicle location. The area can be defined using three or more latitude and longitude coordinates creating a polygonal-shaped area. In one example, the boundaries of the predetermined area can be defined by the availability of a particular subset of satellites from the constellation 60. For instance, a first particular area may have boundaries reflecting that GPS modules 40 within the first particular area can access satellites numbered 19, 23, 31, and 32 of the constellation 60 whereas a second particular area may be geographically defined by boundaries that reflect that GPS modules 40 within the second area can access satellites 19, 22, and 31.

The GNSS satellites providing service to the particular location or predetermined area, such as those in constellation 60, can be detected in a variety of ways. For instance, both the call center 20 and the GPS module 40 can detect the available GNSS satellites. In this sense, detection can include receiving a signal from each of the available GNSS satellites and extracting the ephemeris and almanac data from the each signal. In one example, the GPS module 40 or call center 20 can use the ephemeris and/or almanac data to at least partially determine the number and position of satellites for a particular area. The method 200 proceeds to step 220.

At step 220, SBAS data is received for the detected GNSS satellites. For example, in an SBAS system such as WAAS, the SBAS data can include the integrity, status, and/or correction data provided by wide area master stations. The integrity data can include an indication of the status of each GPS satellite in the constellation 60.

Additionally, the SBAS data can include differential calculations, ionospheric data that predicts transmission delays, and residual errors, which permit calculation of SBAS error bounds (e.g. range corrections). In one example, SBAS data can be received from the space segment 68. In another example, SBAS data is received from the wireless carrier system 14, the land network, or the computer 18. It is worth noting that the vehicle 12 may or may not receive SBAS data. If the vehicle 12 is capable of receiving SBAS data, the data can be forwarded to the call center 20 along with a latitude and longitude coordinate where the SBAS data was received. The method 200 proceeds to step 230.

At step 230, the predefined area is segmented into two or more sections. For instance, if the predefined area is defined by three longitude/latitude pairs, a fourth latitude/longitude pair can create a bisecting line segment between the fourth latitude/longitude pair and one of the three longitude/latitude pairs that is opposite the fourth. In this case, two sections of the predefined area can be defined by the bisecting line. However, it can be appreciated that the predefined area can be divided into an infinite number of sections using various computational, trigometric, and/or geometric tools available to those skilled in the art. The method 200 proceeds to step 240.

At step 240, the service quality of the available satellites is determined using error data for the GNSS satellites included in the received SBAS data. Alternatively, the service quality can be measured using almanac data received from a satellite in the constellation 60 or both the almanac data and the error data. The almanac data includes an indicator of health for all satellites in the constellation 60, satellite clock corrections and coarse orbital data, atmospheric delay parameters, and current GPS time and offset from coordinated universal time (UTC). SBAS data, such as that transmitted from the space segment 68, includes error data (e.g. integrity data), which can include an indicator for all satellites in the constellation 60 and other error data as discussed with respect to step 220. Other factors that can be considered when determining service quality are the user equipment requirements and local interference information. User equipment requirements include cutoff angles below which GPS module 40 cannot adequately receive signals from the constellation 60 or space segment 68. In one example, this angle can be less than or equal to five degrees above the horizon. Local interference information can include information regarding atmospheric or electromagnetic signal interference that affects a particular location or predefined area.

Collectively or individually, the received almanac and error data from the received GNSS or SBAS data, the user equipment requirements, and or local interference information can indicate service quality by implementing an algorithm that interprets the error and/or almanac data. In one example, the service quality can be determined by the number of satellites in the constellation 60 available at any particular location or in any predefined area. And a plurality of different criteria can be established that indicate various levels of service quality. In one embodiment, the criteria can depend on number of available satellites either alone or in combination with a duration of availability of that number of satellites. For example, three service quality levels can be defined: optimal where there are at least four available satellites at the particular location or predefined area; sub-optimal where the number of available satellites drops to three for no more than a predetermined period of time; or no service in all other instances. As another example, the sub-optimal service level can be met using a more complex criteria such as where the number of available satellites drops from four to three for no longer than a short (first) period of time or drops to two for no longer than even a shorter (second) period of time. In one specific embodiment, the first period of time can be one minute and the second period of time can be thirty seconds. Or the gradations of service quality can be more finely separated into four or more different levels.

At step 250, each particular location and/or sections are classified with a performance rating based on the determined service quality. In terms of the example discussed in step 240, the service qualities assessed as 'optimal', 'suboptimal', and 'no service' can also be used as a performance rating used to describe the particular location, predefined area or sections segmented in step 230. For example, the call center 20 can integrate the particular location, area, and/or sections with the service qualities. In that sense, it can be determined at the location or area or the section(s) a service quality in the present, but also a predictive performance rating that can indicate the quality of service delivered in the future. The method 200 proceeds to step 260.

At step 260, each location and/or segmented area is identified on a map display using the performance rating. An example of the map display 300 is generally shown in FIG. 3, which is a screen shot of an exemplary embodiment of a map display. In this example, the map display is shown having two sections 310, 320 divided by a boundary 330. A legend 340 is also shown with examples of performance ratings represented as service quality thresholds. In one example, the service quality thresholds are associated with a color or pattern that significantly contrasts with colors or patterns associated with other service quality thresholds and capable of easy recognition. And in the screen shot shown in FIG. 3, section 310 can be shown using a white background while section 320 can be shown using an orange background indicated here by the hatched lines. It is possible to make the map display available to the live advisors 86 in the call center 20 and/or to the telematics device 20 for display on the visual display 38 within the vehicle 12. The method 200 then ends.

After determining the performance rating for areas or location, this data can be made available to telematics subscribers so that the subscribers can have better information about the quality or accuracy of navigational information they receive. Additionally, the call center 20 can alter the services provided to telematics subscribers based on the availability of service in various predefined areas or locations. For example, the call center 20 could refrain from providing location-based services to the subscriber in areas where the GPS services are sub-optimal or worse. Alternatively, when in such areas the GPS-based navigation can be replaced or enhanced by other navigational methods such as dead reckoning. Other uses of the geographic GPS performance data will become apparent to those skilled in the art.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of processing global navigation satellite system (GNSS) data, the steps comprising:
   (a) identifying one or more GNSS satellites servicing a predefined area based on data received at a facility using a computer readable medium or at a vehicle telematics unit from the one or more GNSS satellites;

(b) receiving at the facility using a computer readable medium or a vehicle telematics unit at least one of GNSS almanac data or space-based augmentation system (SBAS) data for the satellites servicing the predefined area;

(c) determining at the facility using a computer readable medium the service quality of the GNSS satellites servicing the predefined area using the almanac data or SBAS data; and (d) applying a performance rating to the predefined area based on the service quality of the GNSS satellites.

2. The method of claim 1, further comprising the step of defining the boundary of the predefined area by the number of GNSS satellites available within the predefined area.

3. The method of claim 1, wherein the predefined area further comprises three or more latitude and longitude coordinate pairs that define a polygonal-shaped area.

4. The method of claim 1, further comprising the step of receiving the GNSS almanac data or SBAS at a vehicle and forwarding the data to a call center.

5. The method of claim 1, further comprising the step of sectioning the predefined area into a plurality of sections and applying the performance rating to each section.

6. The method of claim 1, further comprising the step of indicating the performance rating based on the number of GNSS satellites available at the predefined area.

7. The method of claim 1, further comprising the step of establishing a plurality of thresholds each representing a level of the performance rating.

8. The method of claim 7, wherein the thresholds further comprise an optimal threshold, a sub-optimal threshold, and a no-service threshold.

9. The method of claim 1, further comprising the step of identifying the performance rating on a map display.

10. A method of processing global navigation satellite system (GNSS) data, the steps comprising:
(a) identifying one or more GNSS satellites servicing a predefined area based on data received at a facility using a computer readable medium or at a vehicle telematics unit from the one or more GNSS satellites;
(b) receiving at the facility using a computer readable medium or from the vehicle telematics unit space-based augmentation system (SBAS) data that indicates the health of the servicing GNSS satellites;
(c) segmenting the predefined area into two or more sections at the facility using a computer readable medium;
(d) classifying each section with a performance rating at the facility using a computer readable medium based on the SBAS data; and
(e) displaying a map that depicts the sections and the predefined area.

11. The method of claim 10, further comprising the step of defining the boundary of the predefined area by the number of GNSS satellites available within the predefined area.

12. The method of claim 10, wherein the sections further comprise three or more latitude and longitude coordinate pairs that define a polygonal-shaped area.

13. The method of claim 10, further comprising the step of receiving the SBAS data at a vehicle and forwarding the data to a call center.

14. The method of claim 10, further comprising the step of establishing a plurality of thresholds each representing a performance rating.

15. The method of claim 14, wherein the thresholds further comprise an optimal threshold, a sub-optimal threshold, and a no-service threshold.

16. A method of processing global navigation satellite system (GNSS) data, the steps comprising:
(a) detecting one or more GNSS satellites available at a particular location based on data received at a facility using a computer readable medium or at a vehicle telematics unit from the one or more GNSS satellites;
(b) receiving space-based augmentation system (SBAS) data for the available GNSS satellites at a facility using a computer readable medium;
(c) determining the service quality of the available GNSS satellites at the facility using a computer readable medium using error data for the GNSS satellites included in the received SBAS data;
(d) classifying the location with a performance rating based on the determined service quality at a facility using a computer readable medium; and
(e) identifying the particular location on a map display using the performance rating.

17. The method of claim 16, further comprising the step of receiving the GNSS almanac data or SBAS data at a vehicle and forwarding the data to a call center.

18. The method of claim 16, further comprising the step of indicating the performance rating based on the number of GNSS satellites available at the predefined area.

19. The method of claim 16, further comprising the step of establishing a plurality of thresholds each representing a performance rating.

20. The method of claim 19, wherein the thresholds further comprise an optimal threshold, a sub-optimal threshold, and a no-service threshold.

* * * * *